(12) United States Patent
Rogers

(10) Patent No.: US 7,781,745 B2
(45) Date of Patent: Aug. 24, 2010

(54) APPARATUS AND METHOD FOR STERILIZATION OF FOOD PRODUCTS

(76) Inventor: Wayne N. Rogers, 3 Iris Dr., East Windsor, NJ (US) 08520

( * ) Notice: Subject to any disclaimer, the term of this patent is extended or adjusted under 35 U.S.C. 154(b) by 204 days.

(21) Appl. No.: 12/212,877

(22) Filed: Sep. 18, 2008

(65) Prior Publication Data

US 2009/0189085 A1  Jul. 30, 2009

Related U.S. Application Data

(60) Provisional application No. 61/062,624, filed on Jan. 28, 2008.

(51) Int. Cl.
*G01N 23/00* (2006.01)
*H01J 37/20* (2006.01)

(52) U.S. Cl. .............. 250/455.11; 250/504 R; 422/21; 422/22; 422/24; 422/121; 422/123; 422/186.3; 219/697; 426/240

(58) Field of Classification Search ........... 250/455.11, 250/504 R; 422/21, 22, 24, 121, 123, 186.3; 219/697; 426/240
See application file for complete search history.

(56) References Cited

U.S. PATENT DOCUMENTS

| | | | | |
|---|---|---|---|---|
| 2002/0122743 A1* | 9/2002 | Huang | ......................... | 422/24 |
| 2006/0147339 A1* | 7/2006 | Hunter et al. | .................. | 422/24 |
| 2007/0031281 A1* | 2/2007 | Stevens | ....................... | 422/24 |
| 2009/0032527 A1* | 2/2009 | Lee et al. | ..................... | 219/679 |

* cited by examiner

*Primary Examiner*—Jack I Berman
*Assistant Examiner*—Meenakshi S Sahu
(74) *Attorney, Agent, or Firm*—Jay Schloff

(57) ABSTRACT

Disclosed are an apparatus and a method for sterilizing a food product. The apparatus comprises an ionization unit for holding the food product, a housing enclosing the ionization unit, a bipolar ionization assembly and a pulse power energization assembly. The bipolar ionization assembly comprises a generator unit and at least one ionization tube for generating bipolar ionization within the ionization unit for sterilizing the food product. The pulse power energization assembly comprises at least one ultraviolet light energy source for generating pulsed energy and at least one ultraviolet light emitting unit for generating pulsed ultraviolet light within the ionization unit upon receiving the pulsed energy. The pulsed ultraviolet light is capable of irradiating the food product for sterilizing purposes.

20 Claims, 3 Drawing Sheets

APPARATUS AND METHOD FOR STERILIZATION OF FOOD PRODUCTS

CROSS-REFERENCE TO RELATED APPLICATIONS

The present invention claims priority under 35 United States Code, Section 119 on the U.S. Provisional Patent Application No. 61/062,624 filed on Jan. 28, 2008, the disclosure of which is incorporated by reference.

FIELD OF THE INVENTION

The present invention relates generally to an apparatus and a method for sterilizing a food product, and more specifically, to an apparatus and a method for inactivating and/or destroying pathogens contaminating a food product using ionization and ultraviolet radiation.

BACKGROUND OF THE INVENTION

Many uncooked and unprocessed food products such as meat, poultry and seafood products, pose the risk of getting contaminated by hazardous pathogens. Efforts have been made to develop techniques for intercepting the presence or growth of such pathogens on the food products. Conventionally, such techniques facilitate reduction and/or elimination of the pathogens by causing surface decontamination of the food products. Some of the conventional techniques for reducing and/or eliminating the pathogens from the food products include ultra-high pressure treatment, heat treatment, chemical treatment, and treatment with pulsed electric fields and high energy.

However, most of the above-mentioned conventional techniques suffer from one or more disadvantages. In general, most of the conventional techniques are known to alter taste, texture or properties of a food product that is being sterilized. For example, the heat treatment technique involves application of heat to a food product, which may cause structural alterations in the food product, thereby adversely affecting taste and texture of the food product. Similarly, the chemical treatment technique involves treating a food product with one or more chemicals and such treatment may also affect taste and texture of the food product.

Conventional techniques involving application of high electric field and/or high energy usually include ionization of air present in vicinity of a food product. More specifically, an ionization chamber or a cabinet may be provided for enclosing the food product and a source of electricity may be used to produce ions, which may interact with pathogens contaminating the food product, for neutralization/destruction thereof. However, most of such techniques involving the principle of ionization use high voltages that may cause deleterious effect on the food product. More specifically, such techniques are believed to cause formation of free radicals in the food product, thereby rendering the food product toxic for consumption.

Further, the aforementioned conventional techniques have not been proven to be very effective for completely inactivating or destroying the pathogens contaminating the food products due to an inability thereof to cause irreparable damage to the pathogens. Furthermore, the aforementioned conventional techniques do not appear to kill all types of pathogens, and more specifically, molds and yeast. Moreover, most of the conventional techniques, such as the conventional techniques based on the principle of heat treatment, are time-consuming.

In addition to the aforementioned conventional techniques, another conventional but beneficial technique for decontaminating the food products involves irradiation of the food products by ultraviolet (UV) light. For the past few years, the UV light has been utilized to control microbial contamination in some medical and food industry areas. However, it is only recently that the technique using the UV light to reduce microbial population on the food products, such as surfaces of meats, and the like, have been developed. Further, various studies have shown that an exposure of the food products to the UV light neither has a deleterious effect on the taste, texture and color of the food products nor does it cause rancidity of the food products as the UV light does not induce production of oxidizing free radicals. Effectiveness of irradiating a food product by the UV light is primarily due to formation of thiamine dimers, which disrupt structure and functioning of genetic constituent of the pathogens, such as bacterial cells.

However, the technique based on irradiation of a food product by the UV light usually employs UV light being generated by a continuous excitation of a light source. Such a use of continuous excitation does not relate to production of a high peak power, which may be obtained using high electric field in the light source. As a result, UV light with a long wavelength but low intensity is being generated by the light source. Irradiation of the food product with such UV light having low intensity affects rate and extent of destruction of the pathogens. Accordingly, a technique employing pulsed power UV light has been developed for an effective destruction of the pathogens. However, such a technique, although effective to an extent, does not result in a hundred percent reduction or a near hundred percent reduction in the population of pathogens contaminating a food product.

Accordingly, there is a need for allowing an effective and rapid sterilization of food products, and more specifically, uncooked food products, in order to result in a hundred percent reduction or a near hundred percent reduction in population of pathogens contaminating the food products. Further, there is a need for providing techniques for sterilization of the food products that avoid deleterious effects on the food products in terms of causing toxicity and/or altering taste and texture of the food products. Furthermore, there is a need for enabling sterilization of the food products without using heat.

SUMMARY OF THE INVENTION

In view of the foregoing disadvantages inherent in the prior art, the general purpose of the present invention is to provide an apparatus and a method for sterilizing food products, which includes all the advantages of the prior art, and overcomes the drawbacks inherent therein.

Accordingly, an object of the present invention is to effectively and rapidly sterilize food products for a hundred percent reduction or a near hundred percent reduction in population of pathogens contaminating the food products.

Another object of the present invention is to employ sterilization techniques that may avoid causing deleterious effects on food products in terms of causing toxicity to the food products, and/or altering taste, texture and color of the food products.

Still another object of the present invention is to employ sterilization techniques without using thermal treatment on food products.

In light of the above objects, in one aspect, the present invention provides an apparatus for sterilizing a food product. The apparatus comprises an ionization unit capable of holding the food product. Further, the apparatus comprises a housing enclosing the ionization unit. Furthermore, the apparatus comprises a bipolar ionization assembly. The bipolar ionization assembly comprises a generator unit positioned within the housing. The bipolar ionization assembly further comprises at least one ionization tube connected to the generator unit and recessed in a wall of the ionization unit. The at least one ionization tube comprises at least one ionization electrode, which is capable of generating bipolar ionization within the ionization unit for sterilizing the food product.

Additionally, the apparatus comprises a pulse power energization assembly. The pulse power energization assembly comprises at least one ultraviolet light energy source configured within the housing for generating pulsed energy. The pulse power energization assembly further includes at least one ultraviolet light emitting unit connected to the at least one ultraviolet light energy source and recessed in the wall of the ionization unit. The at least one ultraviolet light emitting unit is capable of generating pulsed ultraviolet light within the ionization unit, upon receiving the pulsed energy from the at least one ultraviolet light energy source. The pulsed ultraviolet light is capable of irradiating the food product for sterilizing the food product.

In another aspect, the present invention provides a method for sterilization of a food product. The method comprises introducing the food product in an apparatus. The apparatus comprises an ionization unit for holding the food product, a housing enclosing the ionization unit, an input panel configured on an external surface of the housing for receiving an input, a bipolar ionization assembly and a pulse power energization assembly. The bipolar ionization assembly comprises a generator unit positioned within the housing. The bipolar ionization assembly further comprises at least one ionization tube connected to the generator unit and recessed in a wall of the ionization unit. The at least one ionization tube comprises at least one ionization electrode. The pulse power energization assembly comprises at least one ultraviolet light energy source configured within the housing for generating pulsed energy. The pulse power energization assembly further comprises at least one ultraviolet light emitting unit connected to the at least one ultraviolet light energy source and recessed in the wall of the ionization unit.

The method further comprises receiving the input through the input panel of the apparatus. Furthermore, the method comprises initiating a sterilization process. The sterilization process comprises generating bipolar ionization within the ionization unit for sterilizing the food product. The bipolar ionization is being generated by the at least one ionization electrode of the at least one ionization tube. Further, the sterilization process comprises generating pulsed ultraviolet light and irradiating the food product held within the ionization unit with the pulsed ultraviolet light for sterilizing the food product. The pulsed ultraviolet light is being generated by the at least one ultraviolet light emitting unit when the at least one ultraviolet light emitting unit receives the pulsed energy from the at least one ultraviolet light energy source.

These together with other embodiments of the present invention, along with the various features of novelty that characterize the present invention, are pointed out with particularity in the claims annexed hereto and form a part of this disclosure. For a better understanding of the present invention, its operating advantages, and the specific objects attained by its uses, reference should be made to the accompanying drawings and the descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, in which:

Like reference numerals refer to like parts throughout the description of the drawings.

DETAILED DESCRIPTION OF THE INVENTION

The exemplary embodiments described herein detail for illustrative purposes are subject to many variations in structure and design. It should be emphasized, however, that the present invention is not limited to a particular apparatus and a particular method, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

As used herein, the term, "food product," refers to uncooked food products, and food products that may be consumed in a raw form. Further, the term refers to food products that may be subjected to various food processing techniques. Suitable examples of the food products include, but are not limited to, meat, chicken, fish, poultry, produce (farm-produced goods) including fresh fruits and vegetables.

As used herein, the term, "sterilizing" and various forms thereof relate to destruction, inactivation, elimination and/or killing of various pathogens (infective agents) that may contaminate the food products. Suitable examples of such pathogens include, but are not limited to, bacteria, fungi and virus. Further, the term, "sterilization process," as used herein refers to treatment of the food products using ionization technique and pulse power energization technique for a hundred percent or a near hundred percent reduction/destruction of the pathogens contaminating the food products.

In one aspect, the present invention provides an apparatus for sterilizing a food product. The apparatus disclosed herein works on the principle of bipolar ionization technique and pulse power energization technique. Accordingly, the apparatus includes a bipolar ionization assembly and a pulse power energization assembly. Various internal components of the apparatus may operate together in order to function as the bipolar ionization assembly and the pulse power energization assembly. The apparatus and various internal components thereof are explained in detail in conjunction with FIGS. 1 and 2.

Figure 1:
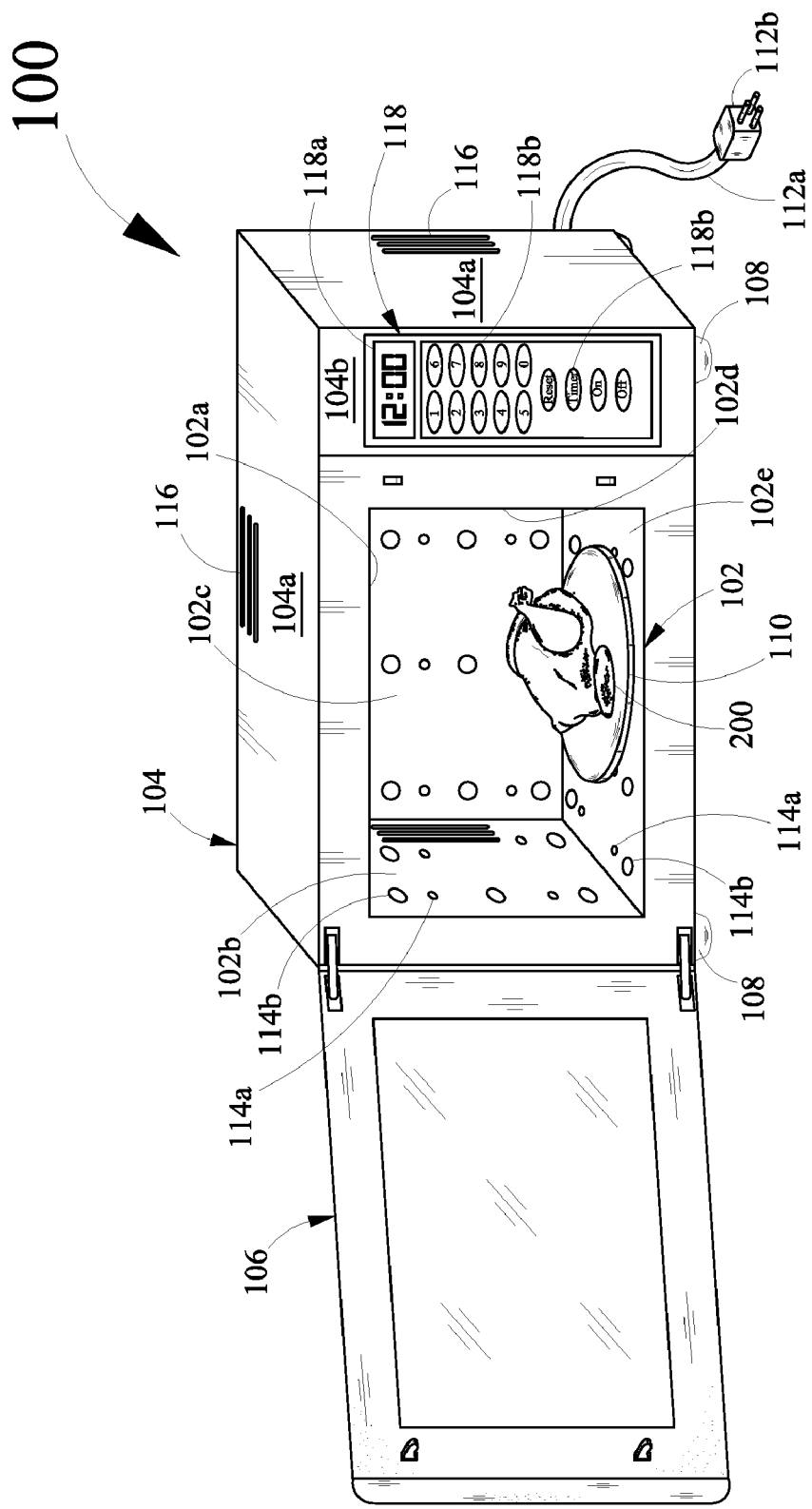
FIG. 1 depicts a perspective view of an apparatus for sterilizing a food product, according to an exemplary embodiment of the present invention.
Figure 2:
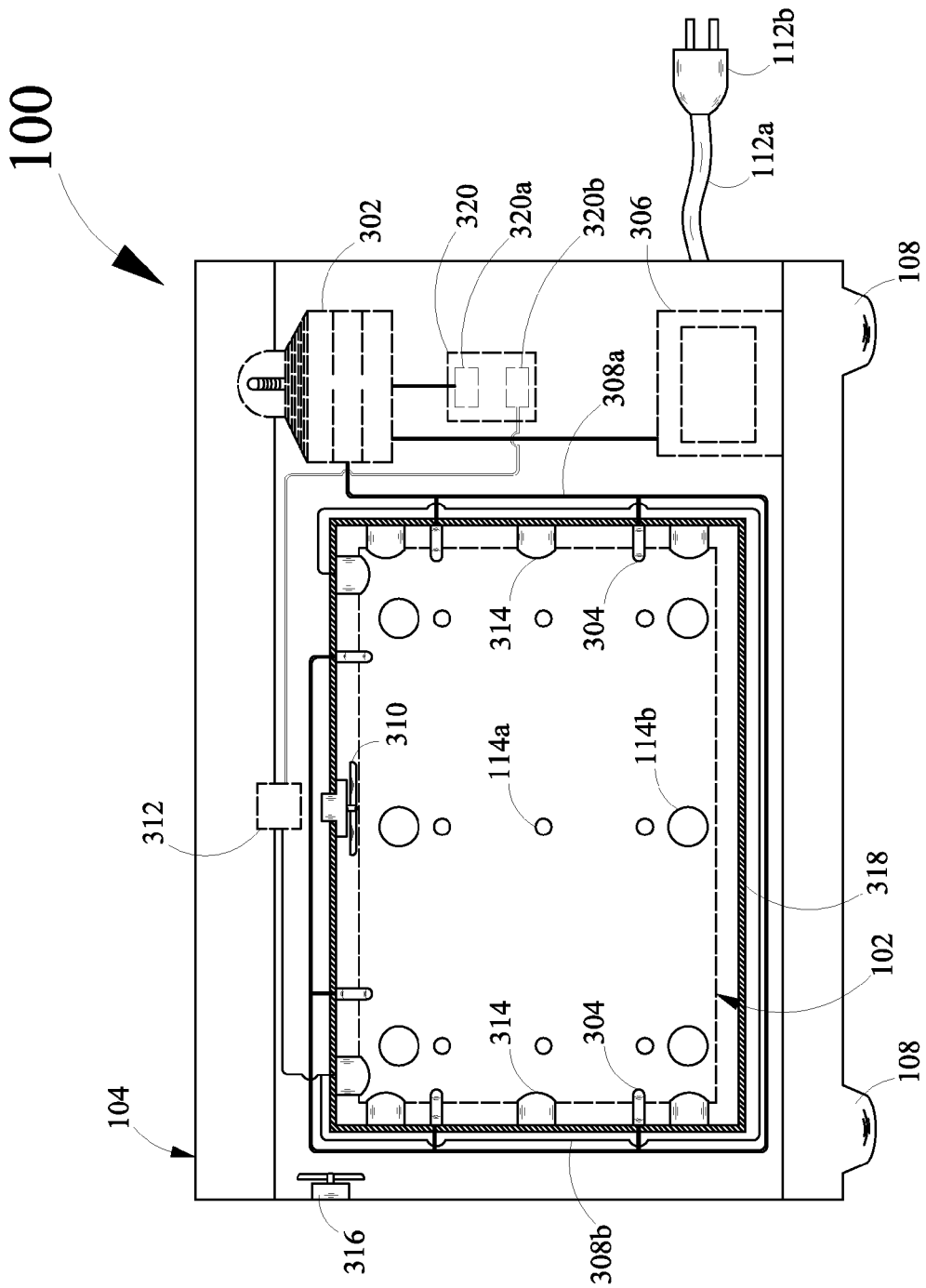
FIG. 2 depicts a front view of the apparatus of FIG. 1 with various internal components thereof for sterilizing the food product, according to an exemplary embodiment of the present invention.

With reference to FIGS. 1 and 2, a view of an apparatus 100 for sterilizing a food product is illustrated. More specifically, FIG. 1 depicts a perspective view of the apparatus 100 for sterilizing a food product, such as a food product 200, according to an exemplary embodiment of the present invention; and FIG. 2 depicts a front view of the apparatus 100 with various internal components thereof for sterilizing the food product 200, according to an exemplary embodiment of the present invention. Further, FIG. 2 has been depicted to illustrate various internal components of the apparatus 100 in the absence of the food product 200. For the purpose of the description of the present invention, the food product 200 is an uncooked whole chicken.

The apparatus 100 (as depicted in FIGS. 1 and 2) includes an ionization unit 102 capable of holding the food product 200. Further, the apparatus 100 includes a housing 104 that encloses the ionization unit 102. The ionization unit 102 may be in the form of a cavity enclosed within the housing 104. More specifically, the ionization unit 102 may be enclosed by a ceiling wall, such as a ceiling wall 102*a*; lateral walls, such as lateral walls 102*b*, 102*c* and 102*d*; and a floor wall, such as a floor wall 102*e* in conjunction with a door, such as a door 106. The door 106 is provided for closing the ionization unit 102 while performing sterilization of the food product 200. The door 106 may be a transparent acrylic hinged door. It should be understood that FIG. 2 depicts the front view of the apparatus 100 in the absence of the door 106 in order to illustrate the various internal components of the apparatus 100.

Further, a plurality of feet 108 may be configured on a bottom external surface (not shown) of the apparatus 100 for balancing and for providing support to the apparatus 100.

The ionization unit 102 includes a rotatable base plate 110 configured on the floor wall 102*e* of the ionization unit 102 for holding the food product 200 thereon. The base plate 110 may be provided with a rotation mechanism (not shown) that allows for rotation of the base plate 110 in a specific direction while performing sterilization of the food product 200. The base plate 110 and the rotation mechanism may be of a construction allowing an easy removal in case it is desired to maintain the food product 200 to be stationary during sterilization. It should be understood that the base plate 110 may be made of materials known in the art, having sufficient structural integrity for holding the food product 200 thereon.

The ionization unit 102 may be manufactured from a metal sheet, which has been surface treated in a conventional manner, for example, by painting or enameling. Alternatively, the metal sheet may be in the form of stainless sheet or any other material known in the art. Similarly, the housing 104 and the plurality of feet 108 may be made of materials (such as a polymeric material, and more specifically, a polystyrene material) known in the art, having sufficient structural integrity for accommodating various components of such an apparatus 100 and for supporting such an apparatus 100, respectively.

As depicted in FIG. 2, the apparatus 100 includes a generator unit 302 and at least one ionization tube 304 (hereinafter referred to as "ionization tubes 304") operatively connected to the generator unit 302. The generator unit 302 and the ionization tubes 304 collectively form a bipolar ionization assembly of the apparatus 100.

The generator unit 302 serves as a power generator that allows for generation of bipolar ionization of an air stream through the ionization tubes 304. The term, "bipolar ionization," as used herein, refers to generation of ions of different polarity by separating atoms or molecules or radicals or by adding or subtracting electrons from atoms by strong electric fields/electrical discharge. More specifically, the term refers to the generation of positive and negative ions. It should be apparent to a person skilled in the art that the generator unit 302 may be a conventional bipolar generator, which includes capacitors, insulators, diodes, a motor, motor shaft, electrical terminals to transfer power supply to the motor, and other such components. Further, the generator unit 302 may include an integral controller (not shown) for selecting a specific operating level for generation of bipolar ionization with the help of the generator unit 302. For supplying power to the generator unit 302, the apparatus 100 includes at least one power source 306 (hereinafter referred to as "power source 306") configured within the housing 104. More specifically, the power source 306 is a step-up transformer. The generator unit 302 is designed to accept a nominal input voltage from the power source 306. In an embodiment of the present invention, the generator unit 302 is designed to accept an input voltage of about 120 volts from the power source 306. A power cord 112*a* with a power plug 112*b* (as depicted in FIGS. 1 and 2) is provided to establish an electrical connection between the power source 306 and a main power supply (such as a wall-plug power provided in an environment where the apparatus 100 is to be employed).

The ionization tubes 304 may be electrically connected to the generator unit 302. More specifically, the ionization tubes 304 may be connected to the generator unit 302 using electrical wire 308*a*. It should be apparent to a person skilled in the art that the ionization tubes 304 may be operatively connected to the generator unit 302 using a plurality of electrical wires, such as the electrical wire 308*a*. Further, each of the ionization tubes 304 is recessed in at least one of the ceiling wall 102*a*, the lateral wall 102*b*, the lateral wall 102*c*, the lateral wall 102*d*, and the floor wall 102*e* of the ionization unit 102, such that, the each of the ionization tubes 304 may be directed towards the food product 200 held within the ionization unit 102. More specifically, the each of the ionization tubes 304 is recessed with the help of at least one through hole 114*a* (hereinafter referred to as "through holes 114*a*") configured in the at least one of the ceiling wall 102*a*, the lateral wall 102*b*, the lateral wall 102*c*, the lateral wall 102*d*, and the floor wall 102*d*, for receiving the ionization tubes 304 therethrough. It should be understood that size and shape of the through holes 114*a* are comparable to corresponding size and shape of the ionization tubes 304.

The each of the ionization tubes 304 includes at least one ionization electrode (not shown), which is capable of generating bipolar ionization within the ionization unit 102 for sterilizing the food product 200. More specifically, the each of the ionization tubes 304 may include two ionization electrodes for generating ions within the ionization unit 102. Further, the each of the ionization tubes 304 may include a glass tube (not shown) and a base, such as a plastic base (not shown), with a male threaded connector (not shown). The glass tube may be crimped around by the at least one ionization electrode to avoid any damage to the glass tube.

Due to utilization of the above-specified bipolar ionization assembly and arrangement thereof, the apparatus 100 provides ionized energy, which is to be combined with an atmosphere (of the ionization unit 102) having a relative humidity equal to that present at normal room temperature. Such a functionality of the apparatus 100 allows for an effective sterilization of the food product 200 as it has been known in the art that destruction of pathogens in a moist normal environment is easier and effective as opposed to in a dry environment. Further, the use of the apparatus 100 employing the disclosed non-thermal sterilization process (based on ionization) helps in a rapid surface decontamination of the food product 200.

A first fan 310, which is a stirrer fan, is also provided in the apparatus 100. Preferably, the first fan 310 is centrally positioned on the ceiling wall 102a of the ionization unit 102. Rotation of the first fan 310 results in a turbulent airflow within the ionization unit 102 for an intensive air mixing in order to provide uniform concentration of the ions in the airflow. Such a uniform concentration of the ions with high energy potential helps to neutralize the pathogens present in the air enclosed within the ionization unit 102 or over the surface of the food product 200. It should be understood that the first fan 310 receives power supply from the power source 306 for operation thereof.

The apparatus 100 of the present invention may also include a filter (not shown) configured within the housing 104 for trapping airborne particles, and more specifically, dust particles. The filter is capable of trapping the airborne particles from within the ionization unit 102 and the housing 104 in order to keep the food product 200 free from the airborne particles. The filter may be a particulate filter having a specific efficiency based on a capability thereof to trap the airborne particles, and accordingly, may be disposed-off and replaced with a new filter after end of an effective lifetime thereof. Suitable examples of the filter include, but are not limited to, a high efficiency particulate air (HEPA®) filter and an Ashrae® dust Spot filter. It should be apparent to a person skilled in the art that a plurality of filters may be employed in the apparatus 100.

In addition to the aforementioned components, the apparatus 100 includes at least one ultraviolet (UV) light energy source 312 (hereinafter referred to as "UV light energy source 312"), and at least one ultraviolet light emitting unit 314 (hereinafter referred to as "UV light emitting units 314") operatively coupled to the UV light energy source 312. The UV light energy source 312 and the UV light emitting units 314 collectively form a pulse power energization assembly of the apparatus 100.

The UV light energy source 312 is configured within the housing 104 for generating pulsed energy. More specifically, the UV light energy source 312 may be installed as a self-contained, single stage and inverting pulse generator capable of serving as an effective electrical power source for lighting the UV light emitting units 314. Further, the UV light energy source 312 may be fired using a trigatron (not shown) through a high voltage auto transformer (not shown). Alternatively and without departing from the scope of the present invention, it should be understood that the UV light energy source 312 may receive power supply from the power source 306. Accordingly, the power source 306 may be configured within the housing 104 for supplying power to at least one of the bipolar ionization assembly and the pulse power energization assembly.

As disclosed herein, the UV light energy source 312 may be a conventional pulse generator and may include a generator housing (not shown) and a time control unit (not shown). The time control unit of the UV light energy source 312 may be used to fire the pulsed energy from the UV light energy source 312 at a pulse repetition rate of about 1 pulse per second to about 1000 pulses per second. Accordingly, the UV light energy source 312 is capable of generating the pulsed energy at a rate of about 1 to about 1000 pulses per second. The UV light energy source, such as the UV light energy source 312, upon operating at a pulse rate of about 1 pulse per second may result in a reduction in population of pathogens by about 6 base 10 logarithm ($\log_{10}$) using an ultraviolet exposure for about 512 microseconds (μs) of pulsed ultraviolet (UV) light.

Furthermore, total electrical discharge time for the pulsed energy may be about 1 μs representing an average peak electrical power per pulse, of about 3 Megawatts (MW) and a power density in the UV light energy source 312 of about 380 kilowatts per square centimeter (kW cm$^{-2}$). At a pulse repetition of about 1 pulse per second, the average power consumption of the pulse power energization assembly is about 3 Watt (W).

It should be noted that at said average power consumption level, no discernible increase in temperature within the ionization unit 102 occurs. However, the apparatus 100 still includes a second fan 316 configured within the housing 104 for maintaining temperature in vicinity of the ionization unit 102 to an acceptable/permissible level. More specifically, the second fan 316 is a cooling fan capable of pulling-in air from outside for circulation around the ionization unit 102. The second fan 316 may pull-in air from outside through a plurality of vents, such as the plurality of vents 116 (as depicted in FIG. 1) configured on an external surface 104a of the housing 104. Accordingly, the second fan 316 allows for supplying a cooling effect to the UV light energy source 312 and the UV light emitting units 314 in order to increase effective lifetime thereof. Further, the sterilization of the food product 200 is substantially unaltered due to such a cooling effect. It should be understood that the second fan 316 may receive power supply from the power source 306 for operation thereof.

As disclosed herein, each of the UV light emitting units 314 are operatively connected to the UV light energy source 312. In an exemplary embodiment, the UV light emitting units 314 are electrically connected to the UV light energy source 312 using an electrical wire 308b. Further, the each of the UV light emitting units 314 is recessed either in at least one of the ceiling wall 102a, the lateral wall 102b, the lateral wall 102c, the lateral wall 102d, and the floor wall 102e of the ionization unit 102 with the help of at least one through hole 114b (hereinafter referred to as "through holes 114b"). Accordingly, it should be understood that the through holes 114b are configured in the at least one of the ceiling wall 102a, the lateral wall 102b, the lateral wall 102c, the lateral wall 102d, and the floor wall 102e for receiving the UV light emitting units 314 therethrough. It should also be understood that size and shape of the through holes 114b is comparable to corresponding size and shape of the light emitting units 314. Moreover, it will be apparent to a person skilled in the art that depending on size and shape of the light emitting units 314 and the ionization tubes 304, size and shape of the through holes 114b may be similar to size and shape of the through holes 114a.

The each of the UV light emitting units 314 is capable of generating high intensity pulsed UV light within the ionization unit 102 upon receiving the pulsed energy from the UV light energy source 312. In an embodiment of the present invention, the pulsed UV light having a wavelength ranging from about 200 nanometers (nm) to about 400 nm is generated for irradiating the food product 200 for the sterilization of the food product 200. It has been well known in the art that exposure of food products, such as the food product 200, using UV light having a short wavelength of about 254 nm is effective than UV light having long wavelength of about 365 nm. Without departing from the scope of the present invention, when food products such as parsley and limes celery are being used as the food product 200 for sterilization then UV light having long wavelength may be used for irradiating the food product 200 in order to kill pathogens, such as *Listeria monocytogenes* and other bacteria.

Further, the UV light emitting units 314 are capable of being operated with an average power of about 100 W. A suitable example of the UV light emitting units 314 includes, but is not limited to, a noble-light XAP Series (obtained from Heraeus Noblelight GmbH), which may be constructed from a clear fused quartz tube filled with Xenon to a pressure of about 450 torr.

It should be understood that the high intensity UV light is effective in killing pathogens that contaminate surfaces of various food products, such as the food product 200. Such a biocidal effect of the UV light is due in part to the formation of lethal thiamine dimers on genetic constituent (Deoxyribonucleic acid) of the pathogens. By using the above-specified pulse power energization technique (PPET) for generating the high intensity pulsed UV light, it is possible to produce significant levels of peak power in the UV light energy source 312. By raising an electric field level applied to the UV light energy source 312, the PPET approach may dissipate many megawatts of peak electrical power in the UV light energy source 312, which in turn results in a greater relative production of the pulsed UV light with a shorter wavelength.

For safety of a user from the UV light while operating the apparatus 100, a protective covering 318 is disposed over the ionization unit 102 within the housing 104 (as depicted in FIG. 2). The protective covering 318 may be installed surrounding the ionization unit 102 to ensure safety while the apparatus 100 is in use. Accordingly, it should be understood that the protective covering 318 should be made of a material, which is resistant or opaque to UV light. A suitable example of such a material includes, but is not limited to, stainless steel.

Further, the apparatus 100 includes an input panel configured on an external surface thereof. As illustrated in FIG. 1, an input panel 118 is configured on a front external surface 104*b* of the housing 104 for receiving an input from a user for initiating the generation of the bipolar ionization and the pulsed UV light. It should be understood that FIG. 2 depicts the internal components of the apparatus 100, and accordingly the depiction of the input panel 118 therefrom is omitted.

The input panel 118 is capable of receiving the input from the user. The term, "input," as used herein, is associated with a predetermined time period for which the food product 200 is to be subjected to the sterilization process. More specifically, the predetermined time period represents a time period, as set by the user, for generating the bipolar ionization and the pulsed UV light within the ionization unit 102 for the sterilization of the food product 200. It should also be understood that the term, "input" also refers to entries made by the user for regulating operation of the apparatus 100. For example, the user may be able to provide input associated with initiating and terminating the sterilization process, as desired. Further and without departing from the scope of the present invention, the user may be able to set a specific operating range of the bipolar ionization to be generated within the ionization unit 102.

The input panel 118 includes a display screen 118*a* and a plurality of buttons 118*b* (hereinafter referred to as "buttons 118*b*"). The display screen 118*a* may depict the predetermined time period for which the food product 200 may be subjected to the sterilization process. Further, during an operative state (state of the apparatus 100 during the sterilization process) of the apparatus 100, the display screen 118*a* may depict remaining time period for completion of the sterilization process. The buttons 118*b* may include an "On" button for initiating the sterilization process, and more specifically, for setting the operative state of the apparatus 100 for the generation of bipolar ionization, and the generation of the pulsed UV light and irradiation of the food product 200 with the pulsed UV light. The buttons 118*b* may also include an "Off" button for terminating the sterilization process, thereby turning off the generation of bipolar ionization and the generation of the pulsed UV light.

Further, the buttons 118*b* may include a "Timer" button accompanied by numeric buttons for entering values of the predetermined time as set by the user based on the type of food product being sterilized. Alternatively, a timer switch may be utilized for setting the predetermined time period for the sterilization process. Furthermore, a "Reset" button may be provided in the input panel 118 for readjusting time duration of the sterilization process.

In addition, the input panel 118 may include buttons for setting the specific operating range of the bipolar ionization to be generated within the ionization unit 102. Such buttons may be associated with at least one of a "Low" ionization status, a "Normal" ionization status and a "High" ionization status. As ionization control is advanced (turned up), level of ionization increases and the ionization status may switch in sequence from "Low," to "Normal," to "High." Further, it should be understood that each of the ionization status is associated with a specific ionization potential as known in the art for a typical bipolar ionization generator. It should be apparent to a person skilled in the art that the apparatus 100 may be designed as per a manufacturer's preference based on the requisite range of ionization, which varies with the type of food product being sterilized, type of environment employing the apparatus 100, and other operating considerations.

The apparatus 100 also includes a control unit 320 configured within the housing 104 for a regulatory control over the initiation, termination, operative ionization range and such other parameters. The control unit 320 is operatively connected to the input panel 118 and is capable of processing the input provided by the user. Further, the control unit 320 includes a first control module 320*a* for regulating the generation of the bipolar ionization within the ionization unit 102 for the predetermined time period. The first control module 320*a* is operatively connected to the integral controller of the bipolar ionization assembly. Further, the control unit 320 includes a second control module 320*b* for regulating the generation of the pulsed UV light within the ionization unit 102 for the predetermined time period and for regulating the irradiation of the food product 200 with the pulsed UV light. The second control module 320*b* is operatively connected to the time control unit of the pulsed power energization assembly. It should be understood that the first control module 320*a* and the second control module 320*b* may be implemented as hardware modules, software modules, firmware modules, or any combination thereof. It should also be understood that the apparatus 100 may include a circuitry (not shown) for establishing the operative connections of the control unit 320 with the first control module 320*a* and the second control module 320*b*. Such circuitry may be designed based on a manufacturer's preference depending on size of the apparatus 100 and type of the first control module 320*a* and the second control module 320*b*. Further, the circuitry may receive power supply from the power source 306 of the apparatus 100.

It should be understood that for the purpose of the description of the exemplary embodiment of the present invention, the apparatus 100 is depicted in the form of an oven, and more specifically, a microwave oven. Such a size and shape of the apparatus 100 should not be considered as a limitation to the scope of the present invention. Accordingly, the apparatus 100 may be designed in a specific size and shape depending on use thereof. For example, the size and shape of the apparatus 100 may vary depending on the use thereof for household and commercial purposes. It should be understood that the apparatus 100 may be employed at home, restaurants, fast food chains, hospitals, cafeterias or any establishment which serves food products.

Further, it should be apparent to a person skilled in the art that the above-described arrangement of the apparatus 100 in terms of the various internal components thereof in conjunction with FIGS. 1 and 2 should not be considered as a limitation to the scope of the present invention. Accordingly, it should be understood that the arrangement of the various internal components of the apparatus 100 may be designed as per a manufacturer's preference.

In another aspect, the present invention provides a method for sterilization of a food product, such as the food product 200 explained in conjunction with FIG. 1. The method is explained in detail in conjunction with FIG. 3.

Figure 3:
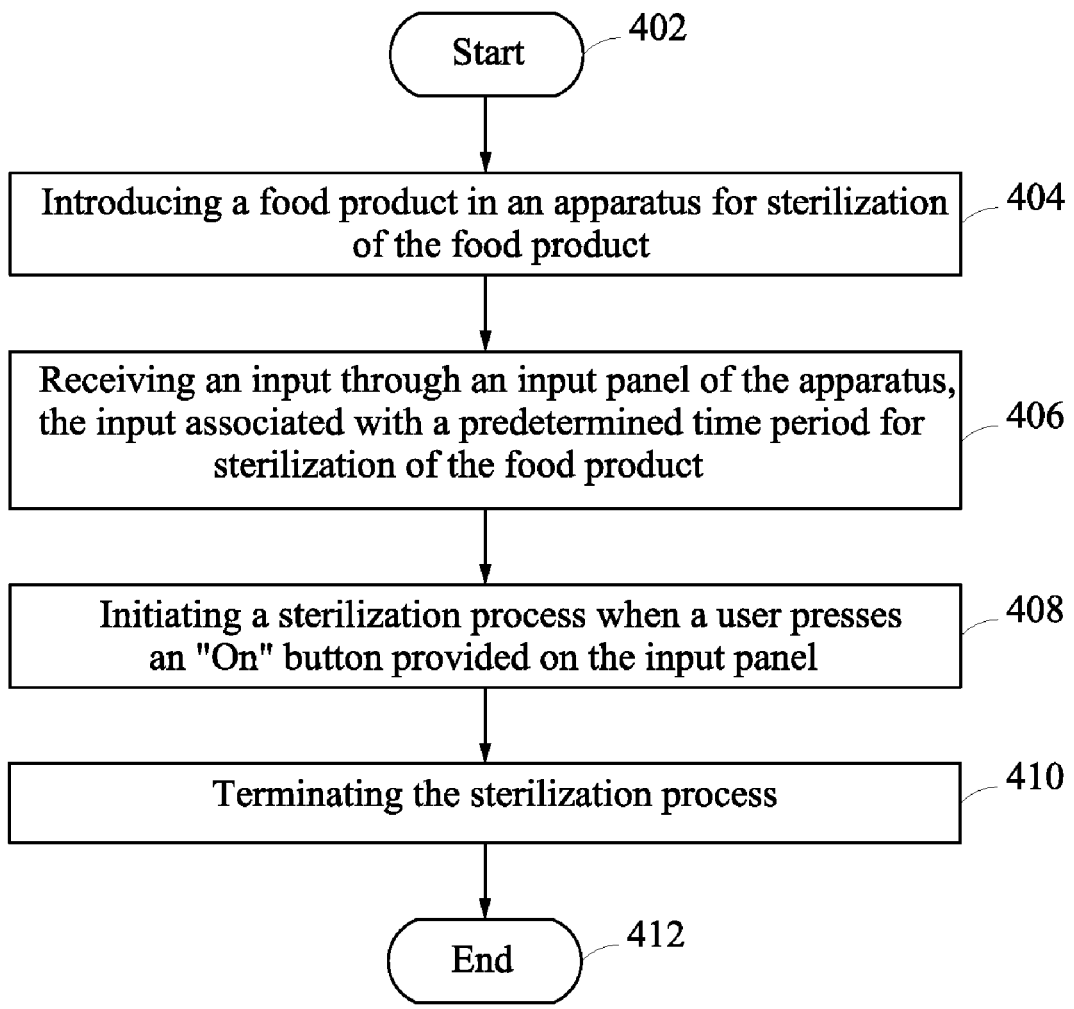
FIG. 3 is a flow diagram representing a method for sterilization of a food product, according to an exemplary embodiment of the present invention.

FIG. 3 is a flow diagram representing a method for sterilization of a food product, such as the food product 200 explained in conjunction with FIG. 1, in accordance with an embodiment of the present invention. For the purpose of description of FIG. 3, reference will be made to FIGS. 1 and 2 as described above. The method starts at 402. At 404, the food product 200 is introduced in the apparatus 100.

As described in FIGS. 1 and 2, the apparatus 100 includes an ionization unit, such as the ionization unit 102, for holding the food product 200. The apparatus 100 further includes a housing, such as the housing 104, for enclosing the ionization unit 102. Additionally, the apparatus 100 includes a door, such as the door 106, for closing the ionization unit 102. Furthermore, the apparatus 100 includes a bipolar ionization assembly having a generator unit, such as the generator unit 302, positioned within the housing 104. The bipolar ionization assembly further includes at least one ionization tube, such as ionization tubes 304, operatively connected to the generator unit 302. The ionization tubes 304 are recessed in a wall, such as the ceiling wall 102a, the lateral walls 102b-d and the floor wall 102e, of the ionization unit 102. Each of the ionization tubes 304 includes at least one ionization electrode. More specifically, the each of the ionization tubes 304 includes two ionization electrodes.

The apparatus 100 also includes a pulse power energization assembly having at least one ultraviolet light energy source, such as the UV light energy source 312, configured within the housing 104 for generating pulsed energy. The pulse power energization assembly also includes at least one ultraviolet light emitting unit, such as the UV light emitting units 314, operatively connected to the UV light energy source 312 and recessed in at least one of the ceiling wall 102a, the lateral wall 102b, the lateral wall 102c, the lateral wall 102d, and the floor wall 102e of the ionization unit 102.

In addition, the apparatus 100 includes an input panel, such as the input panel 118, configured on an external surface, such as the front external surface 104b of the housing 104. The input panel 118 is capable of receiving an input from a user. The input panel 118 includes a plurality of buttons thereon, such as the buttons 118b, for receiving the input from the user. The term, "input," as used herein, is associated with a predetermined time period for which the food product 200 needs to be subjected to a sterilization process. More specifically, the predetermined time defines time duration of the sterilization process as set by the user to insure thorough sterilization of the food product 200. Even more specifically, the predetermined time period represents a time period, as set by the user, for generating the bipolar ionization and the pulsed UV light within the ionization unit 102 for the sterilization of the food product 200. It should also be understood that the term, "input" also refers to entries made by the user about regulating operation of the apparatus 100.

The apparatus 100 also includes a control unit, such as the control unit 320, configured within the housing 104 and operatively connected to the input panel 118. The control unit 320 includes a first control module, such as the first control module 320a, for regulating the generation of the bipolar ionization within the ionization unit 102 for the predetermined time period. The first control module 320a is operatively connected to an integral controller of the generator unit 302 of the bipolar ionization assembly. Further, the control unit 320 may include a second control module, such as the second control module 320b, for regulating the generation of the pulsed UV light within the ionization unit 102 for the predetermined time period. The second control module 320b is operatively connected to a time control unit of the pulsed power energization assembly.

Introduction of the food product 200 in the apparatus 100 includes opening the door 106 of the apparatus 100 and keeping the food product 200 inside the ionization unit 102 of the apparatus 100. Subsequently, the door 106 of the apparatus 100 is closed prior to initiating the sterilization process. Further, a power cord, such as the power cord 112a, of the apparatus 100 is operatively connected to a main power supply through a power plug, such as the power plug 112b. As a result, at least one power source, such as the power source 306 of the apparatus 100 receives power supply through the power cord 112a, and accordingly, is capable of supplying power to the generator unit 302 of the bipolar ionization assembly. It should be understood that the power source 306 may also supply power to the UV light energy source 312. Further, it should be understood that two individual power sources may be employed for supplying power to the generator unit 302 of the bipolar ionization assembly and the UV light energy source 312. Alternatively, the power source 306 supplies power to the generator unit 302 of the bipolar ionization assembly, and a high voltage auto transformer may be utilized for supplying power to the UV light energy source 312.

At 406, an input associated with the predetermined time period is received from a user with the help of a timer button, such as the timer button of the buttons 118b. The predetermined time may be set using numeric buttons accompanying the timer button on the input panel 118. The user may also set an operating range of the bipolar ionization required for sterilization of the food product 200 using specified buttons on the input panel 118. Such an operating range may be associated with at least one of a "Low" ionization status, a "Normal" ionization status and a "High" ionization status. As ionization control is advanced (turned up), level of ionization increases and the ionization status may switch in sequence from "Low," to "Normal," to "High." Further, it should be understood that each of the ionization status is associated with a specific ionization potential known in the art for a typical bipolar ionization generator.

On receiving the input from the user, the control unit 320 processes the input with regard to the predetermined time for which the sterilization process needs to be performed. Accordingly, the control unit 320 may transmit a signal to the generator unit 302 of the bipolar ionization assembly and to the UV light energy source 312 of the pulse power energization assembly via the first control module 320a and the second control module 320b, respectively. As a result, the integral controller of the bipolar ionization assembly selects and regulates a specific operating range/level based on the input provided by the user for the generation of the bipolar ionization. Similarly, based on the input provided by the user, the time control unit of the pulse power energization assembly may select a specific pulse rate of pulsed energy to be generated by the UV light energy source 312 for generating the pulsed UV light to be used for irradiating/exposing the food product 200 for a specific time period. It should be understood that depending on the type of the UV light energy source 312, the apparatus 100 may be manufactured to employ a specific range of pulse rate to be selected by the time control unit.

At 408, the user may initiate the sterilization process by pressing/activating an "On" button from the buttons 118b provided on the input panel 118. The sterilization process includes generating bipolar ionization within the ionization unit 102 for sterilizing the food product 200, and generating pulsed UV light and irradiating the food product 200 held within the ionization unit 102 with the pulsed UV light for sterilizing the food product 200. Without departing from the scope of the present invention, it should be understood that the control unit 320 may start processing the input provided by the user when the user presses/activates the "On" button on the input panel 118.

More specifically, as the sterilization process is initiated, the at least one ionization electrode of the each of the ionization tubes 304 generates bipolar ionization within the ionization unit 102 for sterilizing the food product 200 for the predetermined time period. Further, the UV light emitting units 314 generate pulsed UV light for irradiating the food product 200 held within the ionization unit 102 for the predetermined time period. The pulsed UV light is being generated by the UV light emitting units 314 when the UV light emitting units 314 receive the pulsed energy from the UV light energy source 312.

During the generation of the bipolar ionization, positive voltage pulses are supplied to one of the ionization electrodes of the each of the ionization tubes 304, and negative voltage pulses are supplied to other electrode of the each of the ionization tubes 304. Subsequently, corona discharge is formed, and positive and negative ions are generated within the ionization unit 102 by the ionization electrodes. The ions neutralize pathogens present in air surrounding the food product 200 within the ionization unit 102 and/or pathogens present over surface of the food product 200. Simultaneously, a first fan, such as the first fan 310, of the apparatus 100 may be turned on for providing a turbulent airflow within the ionization unit 102 for an intensive air mixing in order to provide uniform concentration of the ions in the airflow. The first fan 310 may be a stirrer fan utilized for circulating the air within the ionization unit 102. It should be understood that the power source 306 may supply power to the first fan 310 for operating the first fan 310. Further, the first fan 310 may automatically be turned on when the user presses/activates the "On" button from the buttons 118b provided on the input panel 118 for initiating the sterilization process. More specifically, the first fan 310 may be regulated by the integral controller of the generator unit 302.

In an embodiment of the present invention, during the generation of the pulsed UV light, the UV light energy source 312 may be fired using a trigatron through the high voltage auto transformer. The time control unit may then fire the pulsed energy from the UV light energy source 312 at a pulse repetition rate of about 1 pulse per second to about 1000 pulses per second. Accordingly, it should be understood that the UV light energy source 312 is capable of generating the pulsed energy at a rate of about 1 to about 1000 pulses per second. Simultaneously, a second fan, such as the second fan 316, which is configured within the housing 104 of the apparatus 100, may also be turned on. More specifically, the second fan 316 may automatically be turned on when the user presses/activates the "On" button from the buttons 118b provided on the input panel 118 for initiating the sterilization process. The second fan 316 maintains temperature in vicinity of the ionization unit 102. It should be understood that the power source may supply power to the second fan 316 for operating the second fan 316. Further, the second fan 316 may be regulated by the time control unit of the UV light energy source 312.

During the sterilization process, which includes the generation of the bipolar ionization and the generation of the pulsed UV light, a filter employed in the apparatus 100 traps airborne particles, and more specifically, dust particles from within the ionization unit 102 and the housing 104 of the apparatus 100.

It should be understood that when the door 106 of the apparatus 100 is opened during the sterilization process, a power status of the apparatus 100 may change from an "Operative" state to an "Idle" state. Accordingly, it should be understood that the sterilization process may remain suspended until the door 106 has been closed again. Further, at this stage, a reset button, such as the "Reset button" from the buttons 118b on the input panel 118 may be used for readjusting the time duration of the sterilization process.

At 410, the sterilization process, and more specifically, the generation of the bipolar ionization and the generation of the pulsed UV light may be terminated automatically based on the completion of the predetermined time period as set by the user in the form of the input (through the "Timer" button). Accordingly, the state of the sterilization process shifts from the "Operative" state to the "Idle" state. It should be appreciated by a person skilled in the art that for terminating the sterilization process, an "Off" button from the buttons 118b provided on the input panel 118 may be pressed/activated to disable the power supply to the bipolar ionization assembly and the pulse power energization assembly at any point of time, thereby rendering the sterilization process to be in the "Idle" state. Subsequently and as mentioned above, the user may reset time period of the sterilization process using the "Reset" button, as and when desired.

Further, the first fan 310 and the second fan 316 may automatically be turned off when the user presses/activates the "Off" button from the buttons 118b provided on the input panel 118 for terminating the sterilization process.

The method ends at 412 when the main power supply is turned off after completion of the sterilization process. Subsequently, the sterilized food product 200 may be withdrawn from within the ionization unit 102 by opening the door 106 of the apparatus 100. Depending on the type of the food product, the sterilized food product 200 so obtained from within the ionization unit 102 may either be consumed in a raw form, may be used for cooking, or may be packaged in the form of a processed food product.

The present invention provides an apparatus and a method for destruction of various pathogens that may contaminate food products. More specifically, the apparatus and the method serve as effective tools for an efficient and rapid sterilization of the pathogens, and more specifically, microorganisms. The method and the apparatus are based on a combinatorial use of a bipolar ionization technique and a pulsed power energization technique in order to result in a hundred percent reduction or a near hundred percent reduction in pathogenic population contaminating the food products. Further, the disclosed method and the disclosed apparatus avoids utilization of heat or heat through radiation, in order to reduce amount of time required for the sterilization process.

Furthermore, high intensity pulsed UV light, as used herein, avoids causing any deleterious effect on taste, texture and color of a food product being sterilized. Moreover, a cooling fan is employed in the apparatus to help maintain temperature during the sterilization process, thereby, increasing effective lifetime of light source and light emitting units generating the pulsed UV light. The apparatus also employs a stirrer fan for effectively distributing ions generated by the bipolar ionization technique to help promote a thorough kill rate of pathogens contaminating the food product being sterilized.

In addition, the method and the apparatus, as disclosed hereinbefore, are capable of sterilizing the food products before the actual cooking process. However, the method and the apparatus may be also be used for sterilizing food products, which may be consumed in a raw form. Moreover, the method of the present invention may also be employed during processing of various food products, such as meat, fish, poultry and produce. The method may further be employed in shipping industry where processed food products are shipped in sealed refrigerated containers in order to protect the processed food products from contamination by pathogens.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and thereby enable others skilled in the art to best utilize the invention and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present invention.

What is claimed is:

1. An apparatus for sterilizing a food product, the apparatus comprising:
   an ionization unit capable of holding the food product;
   a housing enclosing the ionization unit;
   a bipolar ionization assembly comprising,
      a generator unit positioned within the housing, and
      at least one ionization tube connected to the generator unit and recessed in a wall of the ionization unit, the at least one ionization tube comprising at least one ionization electrode capable of generating bipolar ionization within the ionization unit for sterilizing the food product; and
   a pulse power energization assembly comprising,
      at least one ultraviolet light energy source configured within the housing for generating pulsed energy, and
      at least one ultraviolet light emitting unit connected to the at least one ultraviolet light energy source and recessed in the wall of the ionization unit, the at least one ultraviolet light emitting unit capable of generating pulsed ultraviolet light within the ionization unit upon receiving the pulsed energy from the at least one ultraviolet light energy source, the pulsed ultraviolet light capable of irradiating the food product for sterilizing the food product.

2. The apparatus of claim 1, further comprising an input panel configured on an external surface of the housing for receiving an input from a user, wherein the input is associated with a predetermined time period for generating the bipolar ionization and the pulsed ultraviolet light for the sterilization of the food product.

3. The apparatus of claim 2, further comprising a control unit configured within the housing and connected to the input panel, the control unit comprising a first control module for regulating the generation of the bipolar ionization within the ionization unit for the predetermined time period.

4. The apparatus of claim 3, wherein the control unit further comprises a second control module for regulating the generation of the pulsed ultraviolet light within the ionization unit for the predetermined time period.

5. The apparatus of claim 1, further comprising at least one power source configured within the housing for supplying power to at least one of the bipolar ionization assembly and the pulse power energization assembly.

6. The apparatus of claim 1, further comprising a first fan configured within the ionization unit for circulating air within the ionization unit.

7. The apparatus of claim 1, further comprising a second fan configured within the housing for maintaining temperature in vicinity of the ionization unit.

8. The apparatus of claim 1, further comprising a filter configured within the housing for trapping airborne particles from within the ionization unit and the housing.

9. The apparatus of claim 1, wherein the at least one ultraviolet light energy source is capable of generating the pulsed energy at a rate of about 1 to about 1000 pulses per second.

10. The apparatus of claim 1, further comprising a protective covering disposed over the ionization unit within the housing.

11. A method for sterilization of a food product, the method comprising:
   introducing the food product in an apparatus, the apparatus comprising,
      an ionization unit for holding the food product,
      a housing enclosing the ionization unit,
      an input panel configured on an external surface of the housing for receiving an input, the input panel comprising a plurality of buttons,
      a bipolar ionization assembly comprising
         a generator unit positioned within the housing, and
         at least one ionization tube connected to the generator unit and recessed in a wall of the ionization unit, the at least one ionization tube comprising at least one ionization electrode, and
      a pulse power energization assembly comprising,
         at least one ultraviolet light energy source configured within the housing for generating pulsed energy, and
         at least one ultraviolet light emitting unit connected to the at least one ultraviolet light energy source and recessed in the wall of the ionization unit;
   receiving the input through the input panel of the apparatus; and
   initiating a sterilization process, the sterilization process comprising,
      generating bipolar ionization within the ionization unit for sterilizing the food product, the bipolar ionization being generated by the at least one ionization electrode of the at least one ionization tube, and
      generating pulsed ultraviolet light and irradiating the food product held within the ionization unit with the pulsed ultraviolet light for sterilizing the food product, the pulsed ultraviolet light being generated by the at least one ultraviolet light emitting unit when the at least one ultraviolet light emitting unit receives the pulsed energy from the at least one ultraviolet light energy source.

12. The method of claim 11, wherein the sterilization process is initiated by pressing an "On" button from the plurality of buttons provided on the input panel of the apparatus.

13. The method of claim 11, further comprising terminating the sterilization process.

14. The method of claim 13, wherein the sterilization process is terminated by pressing an "Off" button from the plurality of buttons provided on the input panel of the apparatus.

15. The method of claim 11, wherein the at least one ultraviolet light energy source generates the pulsed energy at a rate of about 1 to about 1000 pulses per second.

16. The method of claim 11, wherein the input is associated with a predetermined time period for generating the bipolar ionization, and generating the pulsed ultraviolet light and irradiating the food product with the pulsed ultraviolet light, for the sterilization of the food product.

17. The method of claim 11, wherein the apparatus further comprises a control unit configured within the housing and connected to the input panel, the control unit comprising a first control module for regulating the generation of the bipolar ionization within the ionization unit for the predetermined time period.

18. The method of claim 17, wherein the control unit further comprises a second control module for regulating the generation of the pulsed ultraviolet light within the ionization unit for the predetermined time period.

19. The apparatus of claim 1 is a microwave oven.

20. The method of claim 11 wherein the apparatus is a microwave oven.

\* \* \* \* \*